H. HILL.
AUTOMOBILE WHEEL.
APPLICATION FILED FEB. 15, 1913.
1,093,413.  Patented Apr. 14, 1914.
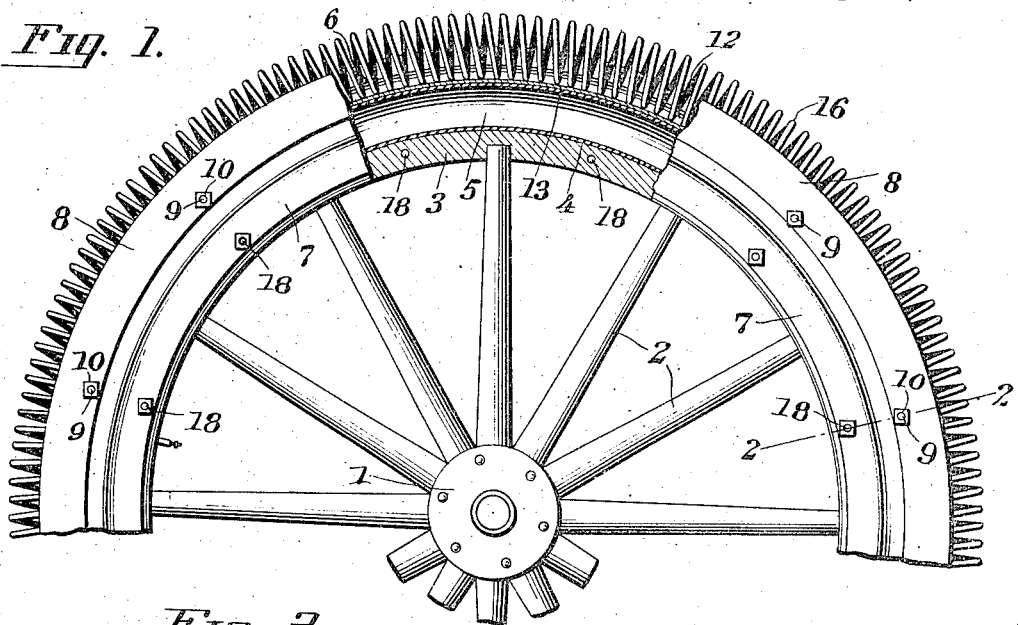
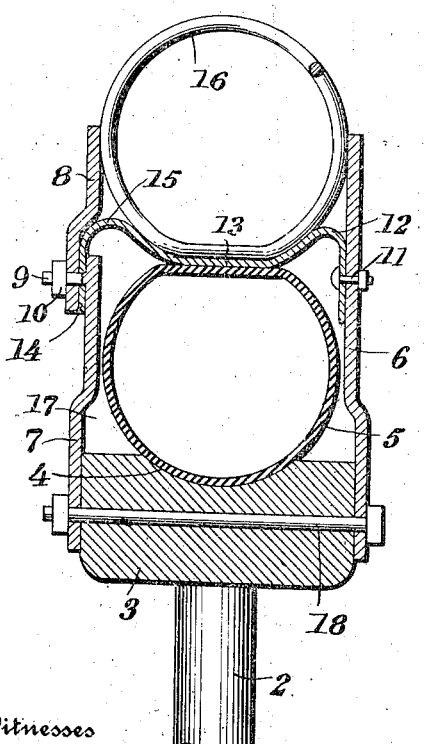
Witnesses
Inventor
Henry Hill
By Victor J. Evans
Attorney

UNITED STATES PATENT OFFICE.

HENRY HILL, OF PHOENIX, ARIZONA.

AUTOMOBILE-WHEEL.

1,093,413.

Specification of Letters Patent.

Patented Apr. 14, 1914.

Application filed February 15, 1913. Serial No. 748,637.

*To all whom it may concern:*

Be it known that I, HENRY HILL, a citizen of the United States, residing at Phoenix, in the county of Maricopa and State of Arizona, have invented new and useful Improvements in Automobile-Wheels, of which the following is a specification.

This invention relates to vehicle wheels; and it has for its object the provision of a wheel of this character which will include a yieldable tread surface which may be constructed from a small portion of rubber and arranged so as to possess a high degree of elasticity.

Another object of the invention is the provision of a wheel wherein the yieldable tread portion thereof will include an inner rubber tube and an outer continuous spiral spring and a yieldable continuous strip of material interposed between the spring and the tube so as to protect the latter from sand or foreign matter.

A further object of the invention is the provision of a wheel which will be so constructed that the outer spring tread portion thereof can be readily disconnected from the rim without necessitating removal of the inner tube structure.

With these and other objects in view, the invention consists of certain novel features of construction, combination and arrangement of parts, as will be hereinafter described and claimed.

In the accompanying drawings:—Figure 1 is a side view of a portion of a vehicle wheel constructed in accordance with my invention; Fig. 2 is a section therethrough taken on line 2—2 of Fig. 1.

The wheel herein illustrated comprises a hub 1, which may be of any suitable well known construction, being preferably provided with rigid radial spokes 2, which are connected at their outer ends with a rim 3, the latter having an annular concavity 4 therein whose walls form a seat for an inflatable inner tube 5.

Guard plates 6 and 7 are located at the opposite sides of said rim 3, being extended parallel therebeyond and at the sides of the tube 5 to prevent the lateral movement thereof upon the rim. The plate 6 is of a greater width than the plate 7, while the latter is provided with a detachable portion 8 whose peripheral edge is alined preferably with the peripheral edge of the plate 6. Clamping studs 9 project from the plate 6, and as illustrated they are extended through the portion 8 and secured thereto through the medium of adjusting nuts 10.

A continuous strip of yieldable material such as leather, canvas or the like connects the companion plates 6 and 7 with each other, and as shown said material has one of its edges secured at 11 to the flange 6 and then extended upwardly therefrom at 12 and then downwardly to provide a central fullness 13 which extends in the direction of the inner tube 5. The other terminal 14 is interposed between the plate 7 and the portion 8 and is extended into the central portion 13 as at 15, the latter portion being similar to the portion 12 and serving to give ample fullness to the material to permit the same to yield when pressure is brought to bear against the inner tube.

The tread portion of the wheel comprises a continuous spiral spring 16 which is interposed between the portion 8 of the plate 7 and the adjacent opposite portion of the plate 6. In this manner the said plate 6 and the portion 8 form guards to hold the spring against lateral displacement. The material 15, while serving to prevent the inner elastic tube 5 against lying in direct contact with the spring 16 also forms a housing to prevent foreign matter which may pass through the convolutions of the spring from entering the tube receiving space 17. Clamping bolts 18 are preferably extended through the rim and through the companion plates 6 and 7 so that the latter may be removed from the rim when it is desired to detach the inner tube 5. When it is desired to remove the spring 16, the portion 8 may be disconnected from the plate 7, so as to permit the spring to be drawn over the peripheral edge of the latter.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

In a device of the character described, a rim, a tube embracing the rim, guide plates removably secured to the sides of the rim, one of the said plates including separable portions, a spiral spring embracing the tube and interposed between the said plates and having a portion projecting beyond the plates so as to provide a tread portion, a yieldable strip of material interposed between the spring and the tube and having its sides extended and embracing a portion of the spring, so as to provide a central fullness, said sides of the strip having their ends extended downwardly in parallelism with the said plates, one of said ends being interposed between the separable portions of the plate and adapted to be clamped therebetween, and the other end of the strip being adapted to have detachable connection with the other of the plates.

In testimony whereof I affix my signature in presence of two witnesses.

HENRY HILL.

Witnesses:
 JAMES HYNES,
 ERNEST F. BISHOFF.